M. EASTERBROOK, Jr.
HARROW.
No. 49,867. Patented Sept. 12, 1865.
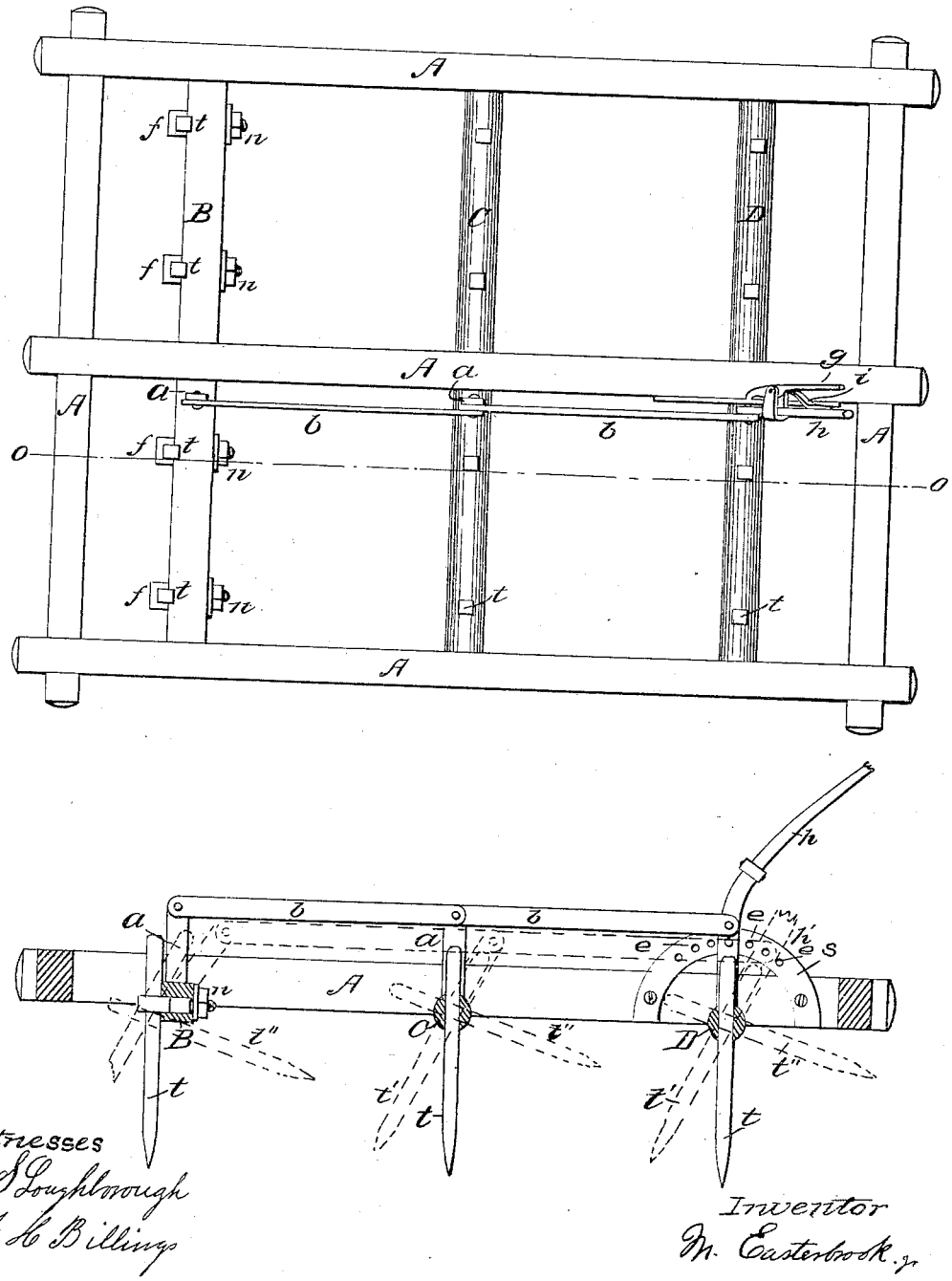

UNITED STATES PATENT OFFICE.

M. EASTERBROOK, JR., OF GENEVA, NEW YORK.

IMPROVEMENT IN HARROWS.

Specification forming part of Letters Patent No. 49,867, dated September 12, 1865.

*To all whom it may concern:*

Be it known that I, M. EASTERBROOK, Jr., of Geneva, in the county of Ontario and State of New York, have invented certain new and useful Improvements in Harrows; and I do hereby declare that the following is a full, clear, and exact description thereof, reference being had to the accompanying drawings, making part of this specification, in which—

Figure 1 is a top view of my invention. Fig. 2 is a vertical section of the same, taken in the plane indicated by the red line $o$ in Fig. 1.

Similar letters of reference indicate corresponding parts in both figures.

This invention consists mainly in fixing the teeth of harrows in pivoted cross-bars, which are connected by a rod or rods to a hand-lever by which they may be set and secured in any desired position, either for dragging heavy or light soil or "quack-grass," weeds, &c.

To enable others to work my invention, I will describe its construction and operation.

I use a square frame, A, into which I pivot several cross bars or rods, B C D. The teeth $t$ are attached to these bars, and the bars of each half of the harrow, if a double one is used, are provided with a post or standard, $a$, to which are pivoted bars or rods $b$, the latter connecting with the hand-lever $h$. This lever forms the standard of the rear roll, as seen in Fig. 2. Said lever is provided with an ordinary self-locking lever-latch, $g$, the spur of which is forced into one of the holes $e$ in the segment $s$ by the spring $i$.

The teeth $t$ may be attached as represented in the front roll, B, by eyebolts $f$. This plan of attachment is altogether preferable on account of the simple manner in which the teeth may be tightened in case the rolls shrink, which is by simply turning up the nuts $n$.

It is frequently necessary, in heavy soil especially, to apply extra weight to the harrow, as heretofore constructed, in order to make them work down to the proper depth. This is effected with my invention by simply setting the hand-lever $h$ back toward the direction indicated by the dotted lines $h'$, which incline the teeth as shown by the dotted lines $t'$. This angle may be increased or diminished, as circumstances may require. If the soil is very light, and it is not desirable to harrow very deep, the teeth should be set in the opposite direction.

When the teeth are to be cleared of grass, weeds, or other obstructions, it is only necessary to unlock the hand-lever $h$ and allow it to swing forward, when the teeth assume the position indicated by the dotted lines $t''$, and, of course, by returning the lever they are readjusted.

As harrows are ordinarily constructed the teeth can only be cleaned by lifting the frame up, and then it is frequently necessary to strip each tooth by hand separately.

The teeth may be placed in the position of $t''$ when the harrow is to be taken to or from the field, or from one field to another.

The harrow may be drawn by the corner or by the center, in which latter case the teeth of each successive roll should be placed so as not to track with those of the next preceding roll.

The harrow may be made in halves and hinged together in the usual way.

The teeth should be set more or less inclined in the direction of $t'$ to work in quack-grass, &c.

What I claim as my invention, and desire to secure by Letters Patent of the United States, is—

The employment or use of the self-locking hand-lever $h$, or its equivalent, whereby the axial bars, to which the teeth $t$ are attached, may be controlled and adjusted while the harrow is moving, substantially in the manner and for the purposes shown and described.

M. EASTERBROOK, JR.

Witnesses:
A. H. BILLINGS,
WM. S. LOUGHBOROUGH.